July 16, 1957
A. S. PATTEN
2,799,202
FASTENER WITH SPRING TONGUES HAVING BITING EDGE
Filed Sept. 11, 1952
2 Sheets-Sheet 1
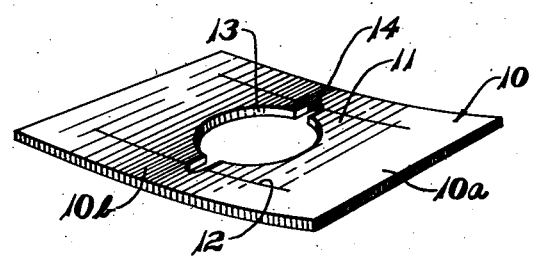
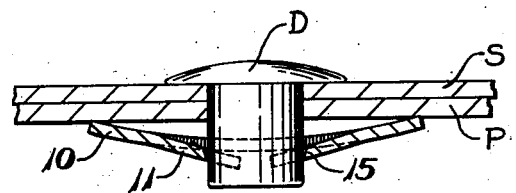
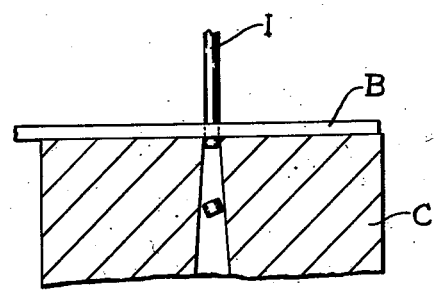
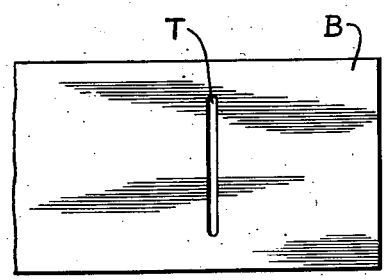
INVENTOR.
ALEXANDER S. PATTEN
BY
ATTY.

July 16, 1957 A. S. PATTEN 2,799,202
FASTENER WITH SPRING TONGUES HAVING BITING EDGE
Filed Sept. 11, 1952 2 Sheets-Sheet 2
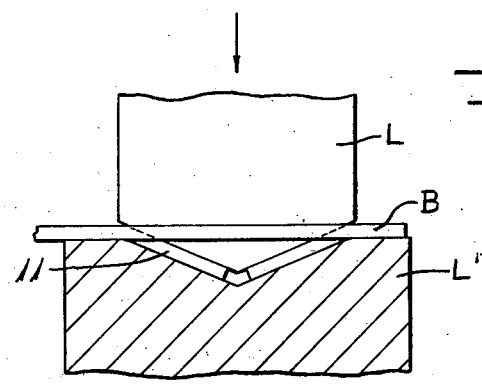
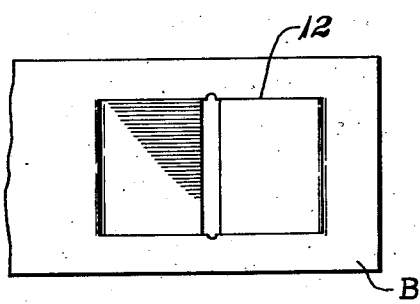
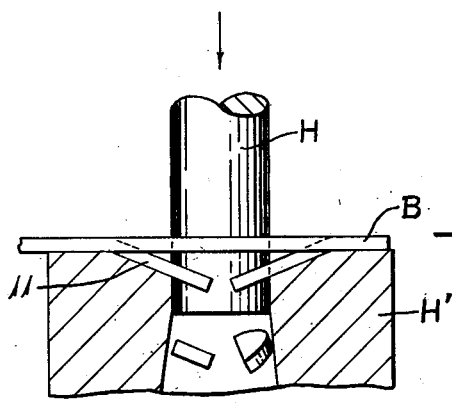
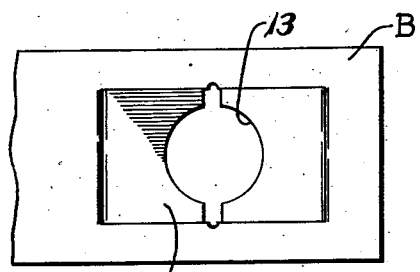
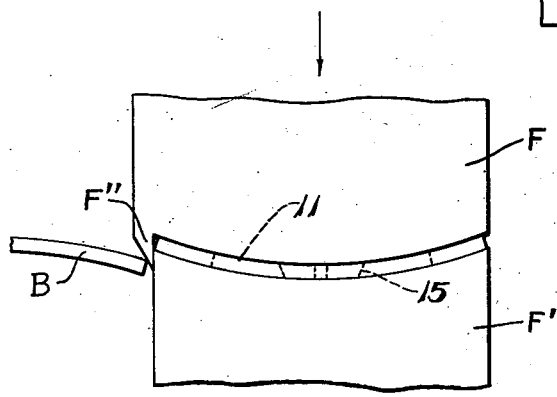
INVENTOR.
ALEXANDER S. PATTEN
BY
ATTY.

United States Patent Office 2,799,202
Patented July 16, 1957

2,799,202

FASTENER WITH SPRING TONGUES HAVING BITING EDGE

Alexander S. Patten, Toledo, Ohio, assignor to Prestole Corporation, Toledo, Ohio, a corporation of Michigan Application September 11, 1952, Serial No. 308,999

3 Claims. (Cl. 85—36)

This invention relates to sheet metal fasteners of the type having two opposed spring tongues for gripping the shank of a stud, for example, inserted therebetween. The invention is also concerned with the method of producing such fasteners.

An object is to produce a spring fastener of the above type so formed that the spring tongues engage the shank with greatly increased effectiveness, thereby more successfully militating against separation from the stud and successfully withstanding an increased load, without materially increasing the cost of the fastener.

Another object is to produce a fastener of the above type, in which the toe edges of the spring tongues engage the stud, achieving thereby improved results of strength, holdability and the like.

A further object is to produce a fastener of the above type which embraces the stud to which it is applied more intimately throughout its peripheral surface and employing in connection with such engaging surface, a biting edge which constitutes the outer edge or the toe edge of the tongue.

A still further object is to produce a new and improved method of producing spring tongue fasteners of the above type in an efficient and economical manner, enabling such fasteners to be produced on a quantity production basis at a relatively low cost.

Other objects and advantages will hereinafter appear, and for purposes of illustration but not of limitation, an embodiment of the invention is shown on the accompanying drawings, in which Figure 1 is a perspective view of the fastener;

Figure 2 is an enlarged longitudinal sectional view showing the fastener applied to a stud for securing a pair of panels together;

Figure 3 is a diagrammatic sectional view showing the first step in producing the fastener in which a transverse portion is pierced from the spring metal strip;

Figure 4 is a plan view showing the strip after it has been pierced according to Figure 3;

Figure 5 shows the next succeeding step in which the fastener is lanced and the spring tongues bent outwardly;

Figure 6 is a plan view of the fastener after it has been subjected to the lancing and bending step illustrated in Figure 5;

Figure 7 is a diagrammatic sectional view showing the fastener being punched to form the notched ends on the tongues;

Figure 8 is a plan view of the fastener after it has been punched shown on Figure 7; and Figure 9 is a diagrammatic view showing the final step in which the fastener is cambered and the tongues are flattened into the plane of the body of the fastener.

The illustrated embodiment of the invention comprises a fastener of spring sheet metal having a relatively thin body 10, in this instance rectangular in form, and having a pair of oppositely arranged tongues 11, the inner ends of which are integral with the body 10, these tongues being formed by parallel slits 12. This provides integral end portions 10a and connecting side or bridge portions 10b. At the outer end of each tongue 11 is a notched portion 13 of curvilinear form. The two notched portions 13, when the tongues are within the confines of the body portion, do not form a true circle but an aperture which is slightly less in diameter than the diameter of the stud to which the fastener is to be applied. As shown, the outer portions of the tongues 11 at the sides of the notched portions, are separated from each other by a space 14, thus enabling the tongues to flex relative to each other without interference.

An important feature of this invention resides in inclining the free or stud engaging edge of each notch 15 to provide a relatively sharp pointed or biting edge on the toe or the convex side of each tongue when the fastener is in applied position. Thus as shown on Figure 2, the pointed edge 15 which engages the stud is on the side of the fastener away from the panel P to which it is applied. Referring again to Figure 2, it will be seen that S designates a supporting panel and P a plate or supported panel which it is desired to hold in engagement with the panel S. Both panels have registering holes through which the shank of a stud D extends. The fastener is applied to the free end portion of the stud D and the tongues 11 are thus flexed outwardly and as flexed, form a circular aperture which is a completely round one or of the contour which intimately engages the shank of the stud almost completely since the hole size is selected for the circumference of the particular stud D. It will be manifest that any tendency of the stud D to move in a direction away from the panel S is definitely resisted by the pointed edges 15 biting into the shank of the stud and likewise any movement of the panel or plate P away from the panel S results in the pointed edges biting into the stud. It is found empirically that by having the pointed edges on the toes of these edges rather than on the heels (the heel being the edge of the notch closer to the panel P), a much greater holding effect is achieved. Thus by a relatively simple expediency, a spring tongue fastener is produced which has much greater holding efficiency than is otherwise the case.

Figures 3 to 9 show the method by which the above described fastener is produced. In Figure 3, B designates a continuous strip of spring metal which is placed upon a die C and by a suitable instrument I, the strip is pierced to produce the transversely elongate slot T. In the next step, the slotted piece is advanced to a die L' and a punch L operates to lance the strip to provide the parallel slits 12 as shown in Figure 6, and at the same time, the tongues 11 are bent downwardly out of the plane of the strip B substantially as shown. In the next succeeding step, as shown on Figure 7, the strip B with the downwardly bent tongues 11 is placed upon a die H'. A punch H then operates to pierce the free end portions of the tongues 11, it being understood that the punch H is of the circumference for the stud or shank to which the fastener is intended to be applied. By this operation, the notches 13 are formed in each of the tongues and by punching the sectors from each of the tongues with the latter in their downwardly inclined position, or that position closely approximating that assumed by these tongues in engaging the shank, the pointed edge at the toe of each of the tongues is thus produced. In the final step, as shown on Figure 9, the cooperating dies F' and F operate not only to effect a camber of the body 10 of the fastener, but also by means of a knife F'', the body is severed from the continuous strip B and the tongues 11 are bent back into the plane of the body, this being desirable for the packaging of the fasteners in a container to prevent the fasteners being caught together by the projecting tongues. It is not always necessary to form an arch or camber in the fastener body 10, but under some conditions, it is desirable in order to increase the spring action of the fastener when in applied position.

It is to be understood that numerous changes in details of construction, arrangement, operation and choice of materials may be effected without departing from the spirit of the invention especially as defined in the appended claims.

What I claim is:

1. A fastener comprising an arcuate body of thin spring metal having opposite ends, the body being concavo-convex from one end to the other, a pair of oppositely directed tongues having outer and inner ends, said tongues being integral with the body at their outer ends and normally lying along the arc and disposed in the plane of the body, said tongues each having a notched portion at the inner end thereof, and a knife edge along substantially the entire extent of each notched portion, the knife edge being on the convex side of the tongue, the notched portion of each inner end normally inclining outwardly from the knife edge to the concave side of the tongue.

2. A fastener as claimed in claim 1, said notched portions being arcuate.

3. A fastener for engaging the shank of a member of predetermined diameter, comprising an arcuate concavo-convex body of thin spring metal, a pair of oppositely directed tongues having outer and inner ends, said tongues being integral with the body at their outer ends and normally lying along the arc of and disposed in the plane of the body, said tongues each having an arcuate notched portion at the inner end thereof and a knife edge along substantially the entire extent of each notched portion, the knife edge being on the convex side of the tongue, the notched portion of each inner end normally inclining outwardly from the knife edge to the concave side of the tongue, the arcuate notched portions of the tongues, with the latter disposed in the plane of the body, defining an opening of less diameter than the diameter of said shank, said tongue flexing outwardly beyond the plane of the convex side of the body in response to the insertion therebetween of said shank, the arcuate notched portions intimately engaging the shank in outwardly flexed position.

References Cited in the file of this patent

UNITED STATES PATENTS

| | | |
|---|---|---|
| 1,156,279 | Duke | Oct. 12, 1915 |
| 2,225,394 | Tinnerman | Dec. 17, 1940 |
| 2,254,288 | Holleran | Sept. 2, 1941 |
| 2,334,046 | Tinnerman | Nov. 9, 1943 |
| 2,421,115 | Carlson | May 27, 1947 |
| 2,561,036 | Sodders | July 17, 1951 |